`US006234657B1`

(12) United States Patent
Shih

(10) Patent No.: US 6,234,657 B1
(45) Date of Patent: May 22, 2001

(54) LIGHT SOURCE STRUCTURE FOR OPTICAL FIBER DECORATION

(76) Inventor: Shan Wei Shih, No. 22-1, Lane 318, Sec. 1, Chungyang Road, Tucheng City, Taipei Hsien (TW)

( * ) Notice: Subject to any disclaimer, the term of this patent is extended or adjusted under 35 U.S.C. 154(b) by 0 days.

(21) Appl. No.: 09/415,515

(22) Filed: Oct. 6, 1999

Related U.S. Application Data

(63) Continuation-in-part of application No. 08/885,951, filed on Jun. 30, 1997, now abandoned.
(51) Int. Cl.[7] .............................. F21V 8/00; F21V 17/02
(52) U.S. Cl. ......................... 362/559; 362/554; 362/581
(58) Field of Search .............................. 40/444, 547, 581; 362/230, 231, 554, 555, 559, 560, 565, 581

(56) References Cited

U.S. PATENT DOCUMENTS

| | | | |
|---|---|---|---|
| 4,097,917 | * 6/1978 | McCaslin | 362/565 |
| 4,830,899 | * 5/1989 | Nakahashi et al. | 362/556 |
| 5,231,689 | * 7/1993 | Reidinger | 40/547 |
| 5,347,437 | * 9/1994 | Cocca et al. | 362/21 |
| 5,477,424 | * 12/1995 | Mocha | 362/555 |
| 5,585,782 | * 12/1996 | Yosko | 362/35 |

\* cited by examiner

Primary Examiner—Alan Cariaso
(74) Attorney, Agent, or Firm—Raymond Y. Chan; David and Raymond Patent Group

(57) ABSTRACT

A light source structure for optical fiber decoration, including a display member, optical fibers and light emitting diodes, wherein display ends of the optical fibers are arranged into various pictures of bright points or into a solid pattern. Root ends of the optical fibers are binded and disposed beside the light emitting diodes, whereby the light from the diodes is conducted by the optical fibers to the display member to provide decorative effect in bright point pattern.

2 Claims, 8 Drawing Sheets

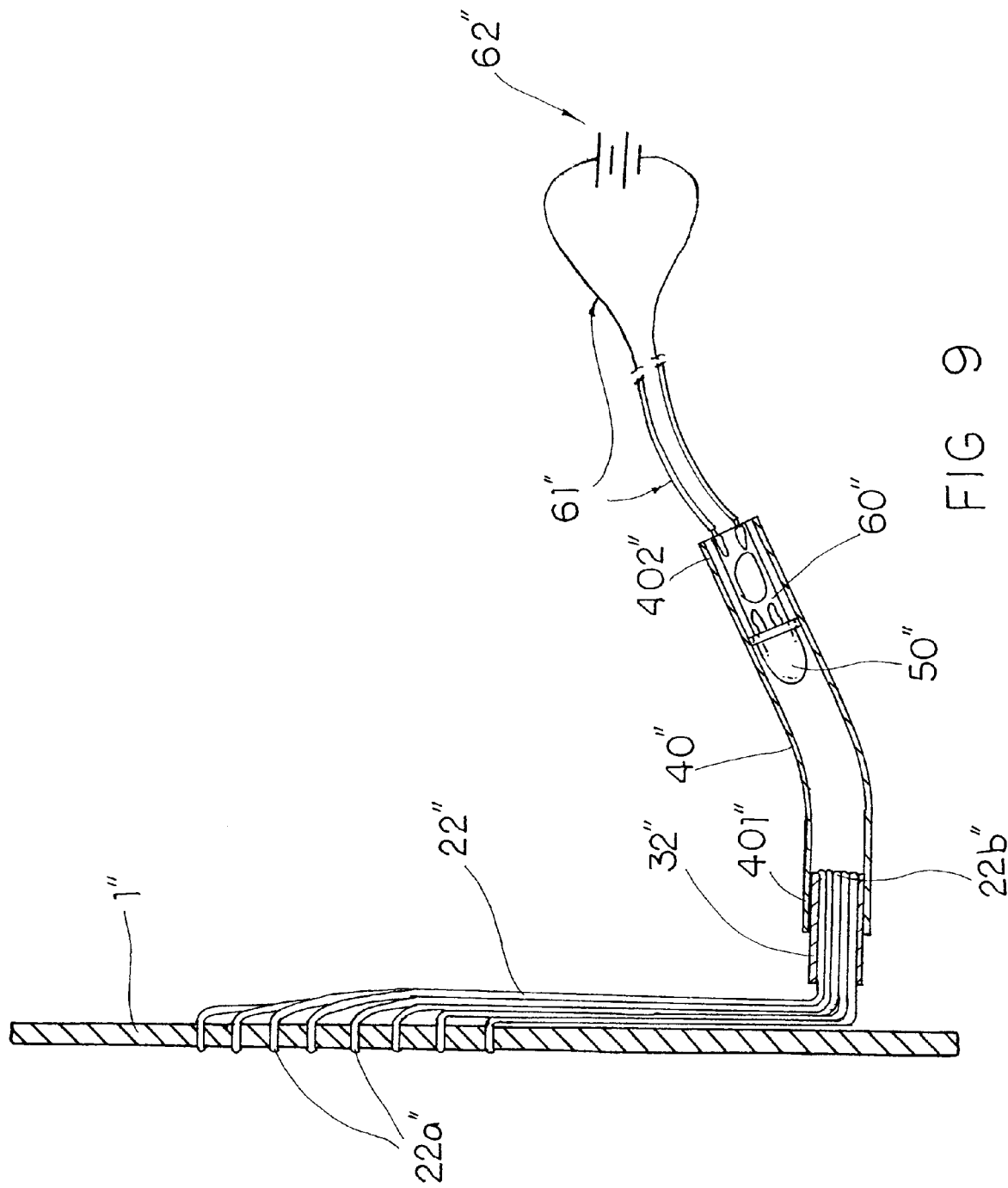

LIGHT SOURCE STRUCTURE FOR OPTICAL FIBER DECORATION

CROSS REFERENCE OF RELATED APPLICATION

This is a Continuation-In-Part application of a non-provisional patent application No. 08/885,951, filed Jun. 30, 1997 now abandoned.

BACKGROUND OF THE PRESENT INVENTION

1. Field of Invention

The present invention relates to a light source structure for optical fiber decoration, wherein the light from multiple light emitting diodes with different colors is conducted by the optical fibers to a display member to create versatile pictures with flickering effect in a bright point pattern

2. Description of Related Arts

FIG. 1 shows a conventional colorful light source for optical fiber decoration, in which inner ends of multiple optical fibers 62 are disposed on a decoration board 6, while the other ends thereof are binded by a binding frame 621. A rotary disc 63 is deposed beside the binding frame 621 and equipped with multiple transmitting plates 631 with different colors. When the rotary disc 63 is rotated, the light passes through different transmitting plates 631 to create different colors of light. The light is conducted by the optical fibers 62 to form versatile change of pictures on the decoration board 61. Several shortcomings exist in such arrangement as follows:

1. The light source ends of the optical fibers cannot be arranged or divided.
2. A volume of the conventional light source is relatively large and the necessary heat-radiating space is also larger so that it is not applicable to a smaller decoration.
3. The consumption of energy is great and problems of over-heating and improper layout of circuit may take place.

FIG. 2 shows another colorful light source for optical fiber decoration, including a decoration board 71 with bright points of picture 711, optical fibers 72 and binding frame 721. The light source 74 is disposed in a rotary ring 73 formed with peripheral transmitting plates 731 with different colors. The rotary ring 73 is driven by a driving means 75 to shift the different transmitting plates 731 so as to create different colors of light. The light is conducted by the optical fibers 72 to the decoration board 71 to form a picture of bright points 711. Such arrangement still has the following shortcomings:

1. The occupied room is even larger than the aforesaid device.
2. The problems of great consumption of energy and high temperature and unstable circuit still exist.
3. The cost is even higher.

SUMMARY OF THE PRESENT INVENTION

It is a primary object of the present invention to provide a light source structure for optical fiber decoration, in which light emitting diodes are employed as light source to stably emit light. In addition, the diodes can have multiple colors for selection. The light from the diodes is conducted by the optical fibers to the display member to form distributed bright points on the decoration.

It is a further object of the present invention to provide the above light source structure in which multiple sets of light emitting diodes with identical color or different colors are controlled by electronic circuit to sequentially flicker and change the colors. Also, by means of control of integrated circuit, the flickering and change of colors can cooperate with a melody.

It is still a further object of the present invention to provide the above light source structure in which the strength of the light emitting diodes with different colors is changed or mixed by other device such as a beam splitter so as to create infinite change of colors.

It is another object of the present invention to provide the above light source structure in which each light emitting diode light source of particular color is integrally connected to a bundle of optical fibers by means of a light collection sleeve for directing and transmitting all the light energy onto the root ends of the optical fibers without light leaking out.

It is another object of the present invention to provide the above light source structure in which the light emitting diodes of different colors is protected from affecting with each other so that the pure color can be directed to the desired optical fibers.

The advantages of the present invention are as follows:

1. The cost is greatly reduced.
2. The light emitting diodes are powered on by much lower voltage and current than the conventional bulb so that the problem of high temperature and radiation is eliminated and the entire circuit can work in a more stable state. Therefore, the safety is ensured and the application range is wider.
3. The low voltage and current of the light emitting diodes lead to low consumption of energy so that the light source is applicable in a device with small volume, such as a Christmas card.
4. Without the problem of high temperature, the optical fibers are free from thermal deformation.

The present invention can be best understood through the following description and accompanying drawings, wherein

BRIEF DESCRIPTION OF THE DRAWINGS

FIG. 9 is a sectional view of a seventh embodiment of the present invention.

DETAILED DESCRIPTION OF THE PREFERRED EMBODIMENT

Figure 1:
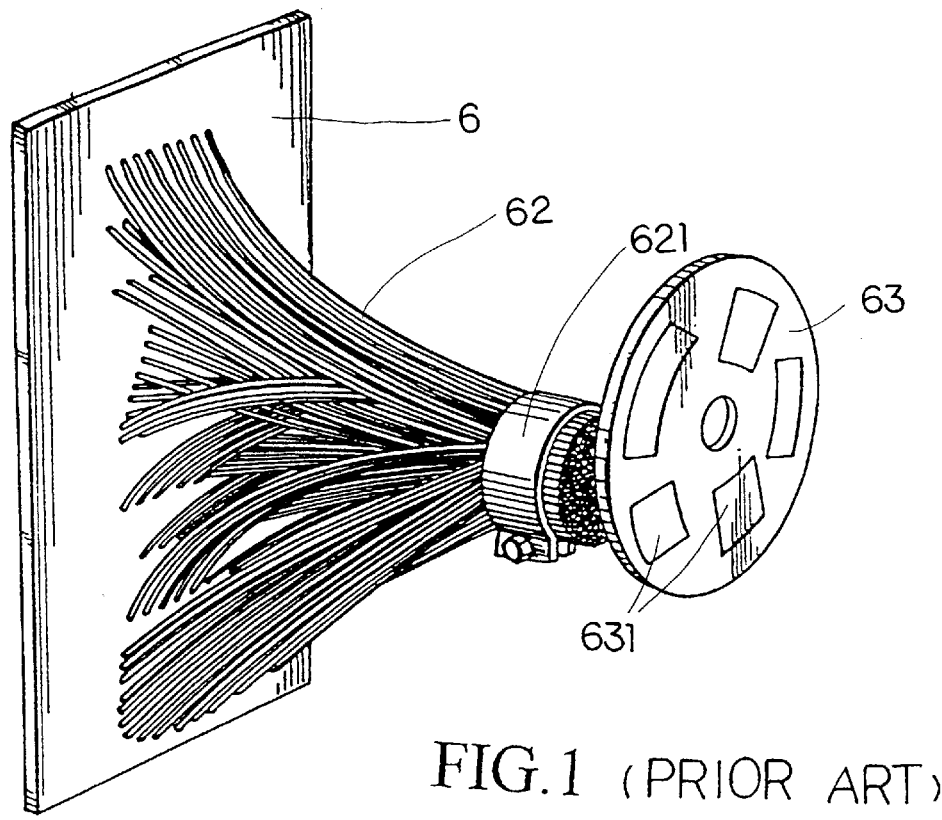
FIG. 1 is a perspective view of a conventional light source for optical fiber decoration.
Figure 2:
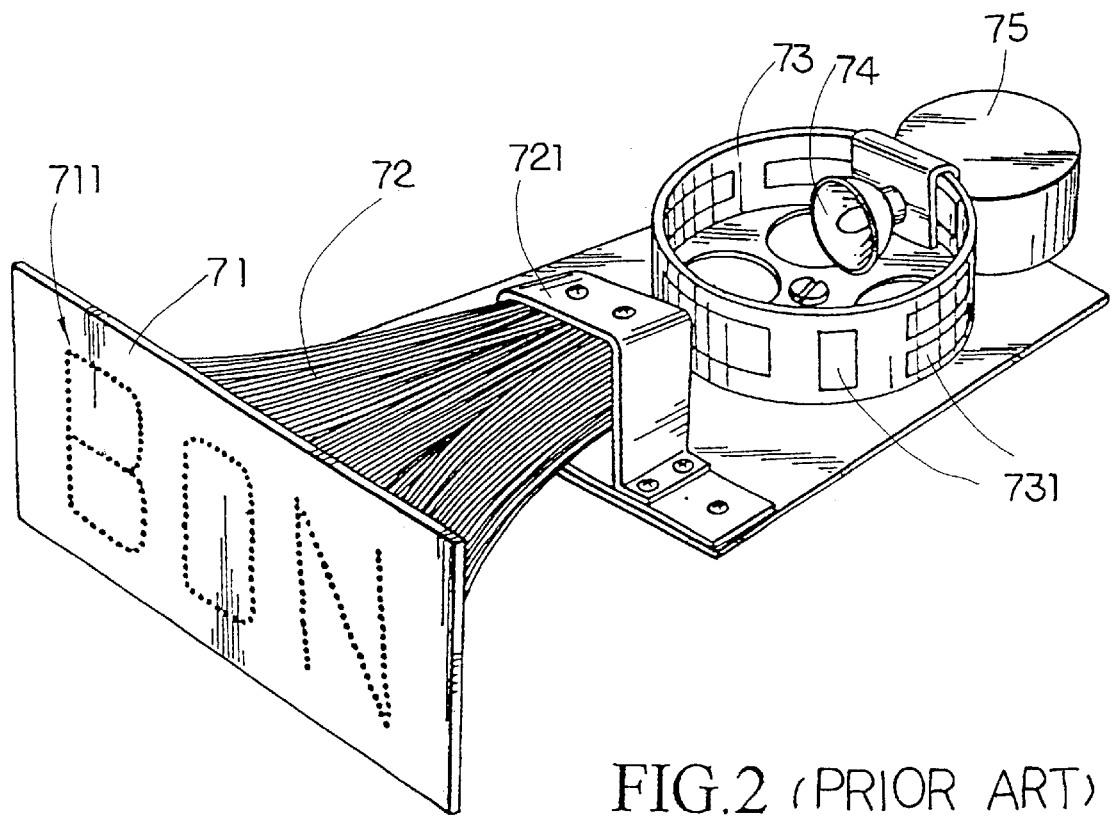
FIG. 2 is a perspective view of another conventional light source for optical fiber decoration.
Figure 3:
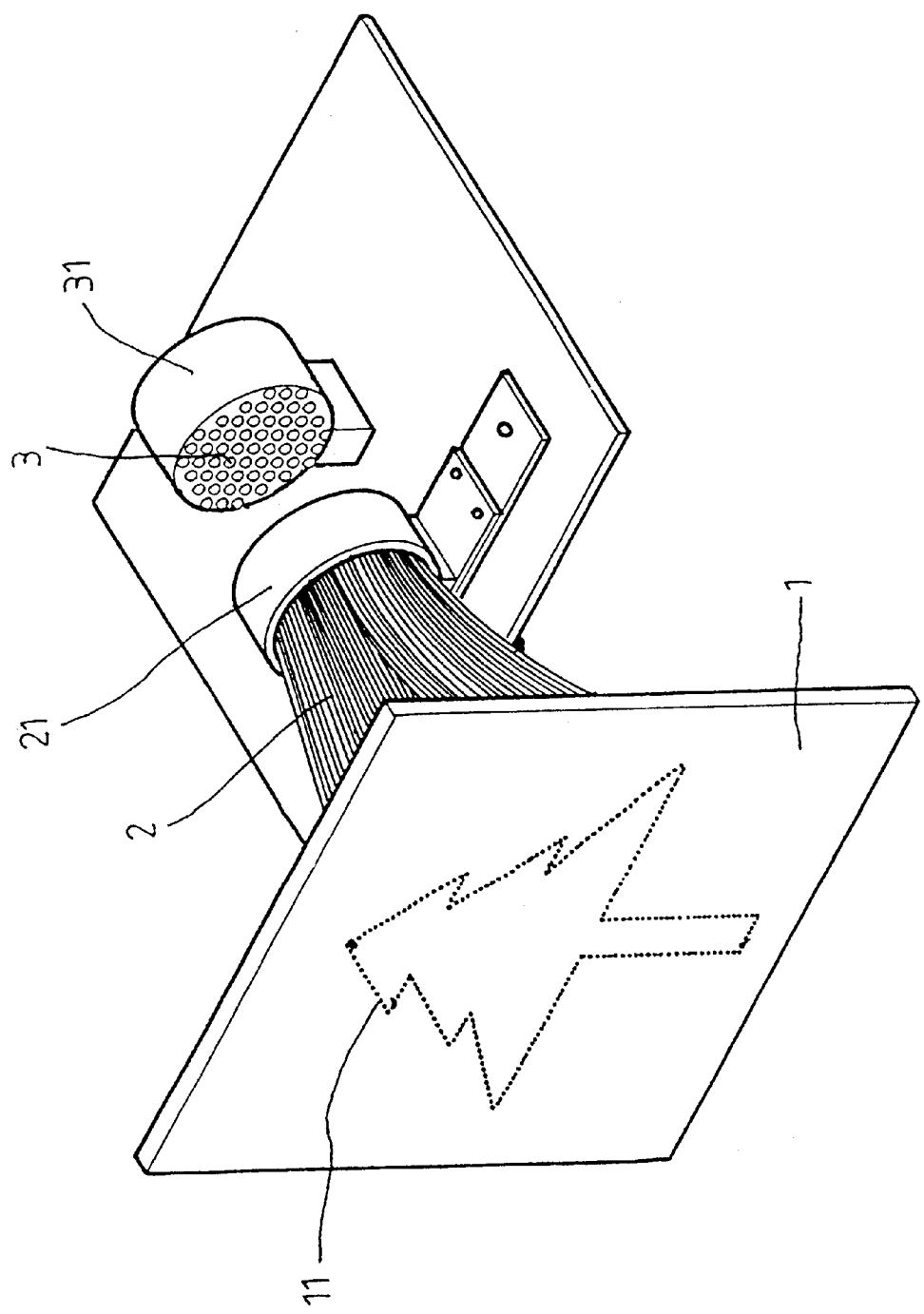
FIG. 3 is a perspective view of a first embodiment of the present invention.

Please refer to FIG. 3. According to a first embodiment of the present invention, the light source structure includes a display member 1, optical fibers 2 and light emitting diode 3. The inner ends of the optical fibers 2 are binded by a binding frame 21, while the other ends of the optical fibers 2 are arranged on the display member 1 into a picture 11 of bright points. The light emitting diode 3 is disposed in a control box 31 adjacent to the inner ends of the optical fibers 2 to provide identical color or different colors which are evenly distributed. The electronic circuit in the control box 31 is able to turn on/off or switch the different colors. Alternatively, multiple sets of different colors with different strength can be cooperatively mixed to create infinite changes of colors.

Figure 4:
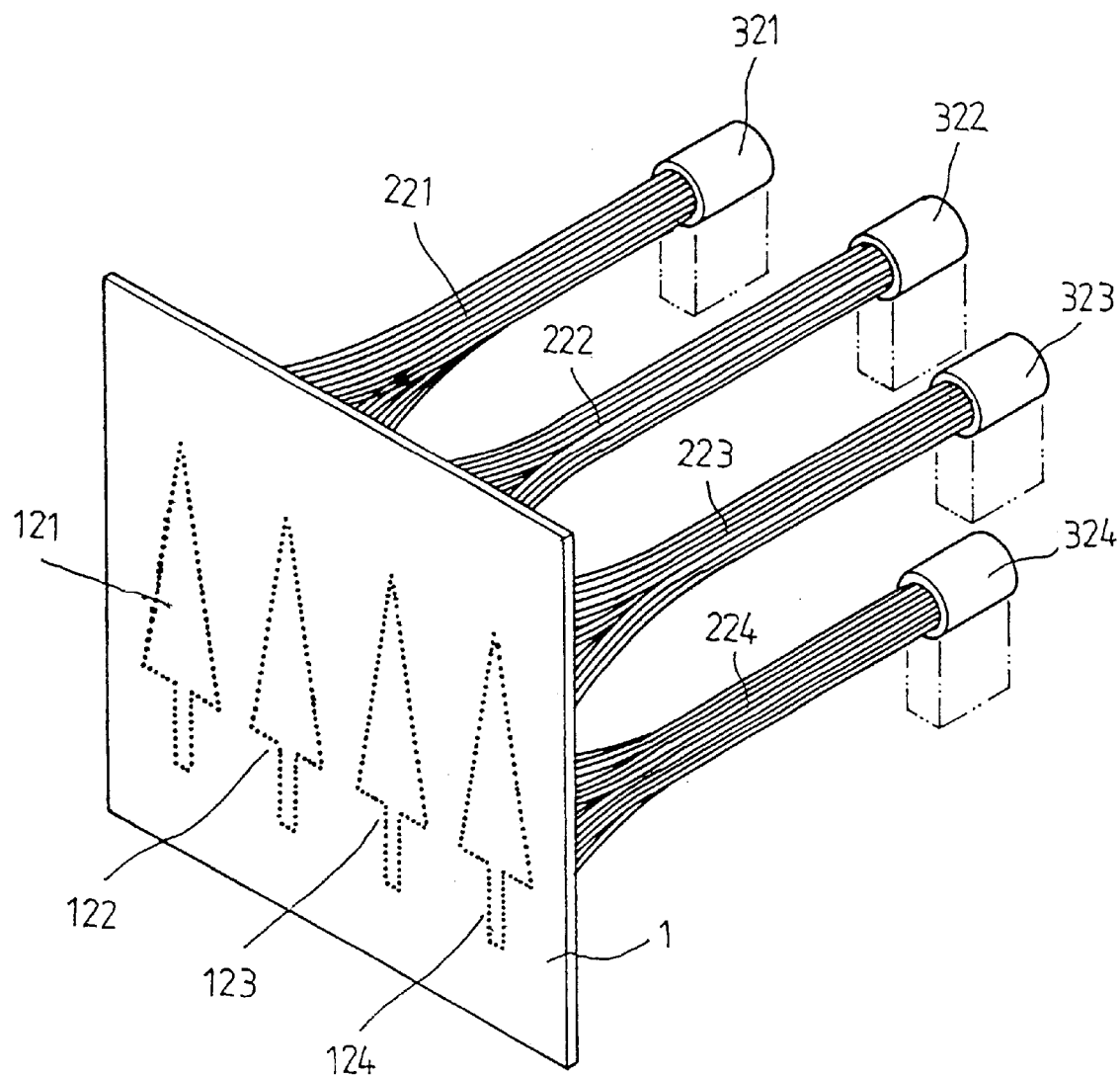
FIG. 4 is a perspective view of a second embodiment of the present invention.

FIG. 4 shows a second embodiment of the present invention, in which multiple control boxes 321, 322, 323, 324 for controlling multiple sets of light emitting diodes with different colors can conduct the light to the display member 1 via the optical fibers 221, 222, 223, 224 to form different pictures 121, 122, 123, 124 of bright points. By means of the cooperation between the control circuits, the bright pictures 121, 122, 123, 124 can be turned on or off sequentially or as a melody.

Figure 5:
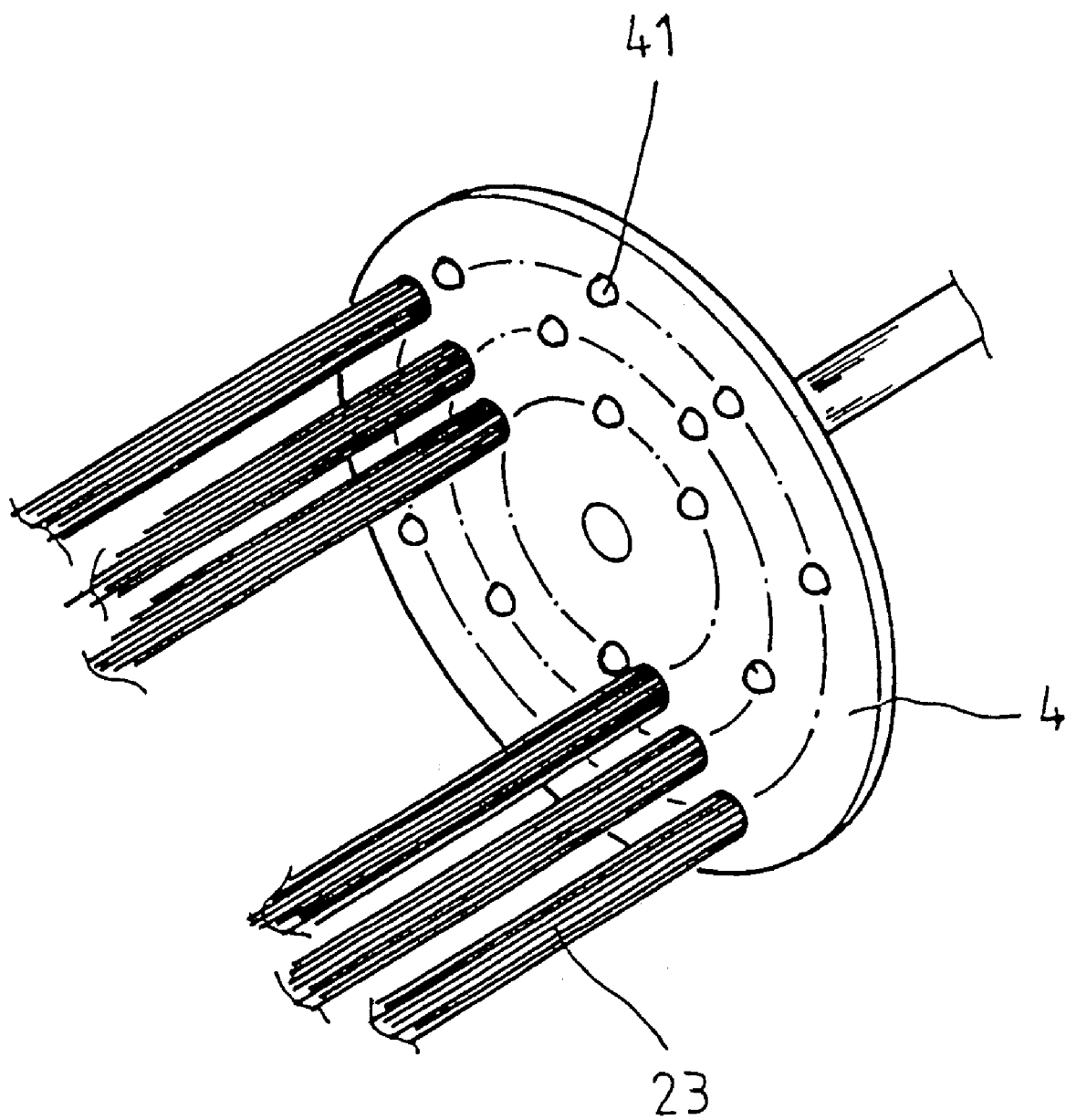
FIG. 5 is a perspective view of a third embodiment of the present invention.

FIG. 5 shows a third embodiment of the present invention, in which the light emitting diodes 41 are disposed on a rotary disc 4 (or other movable article) which is shifted along a fixed path. The multiple optical fibers 23 are disposed in the moving path of the light emitting diodes 41. Accordingly, when the rotary disc 4 is rotated, the light emitting diodes 41 are shifted. When the light emitting diodes 41 get close to the optical fibers, the light is conducted therethrough to create flickering and change of colors.

Figure 6:
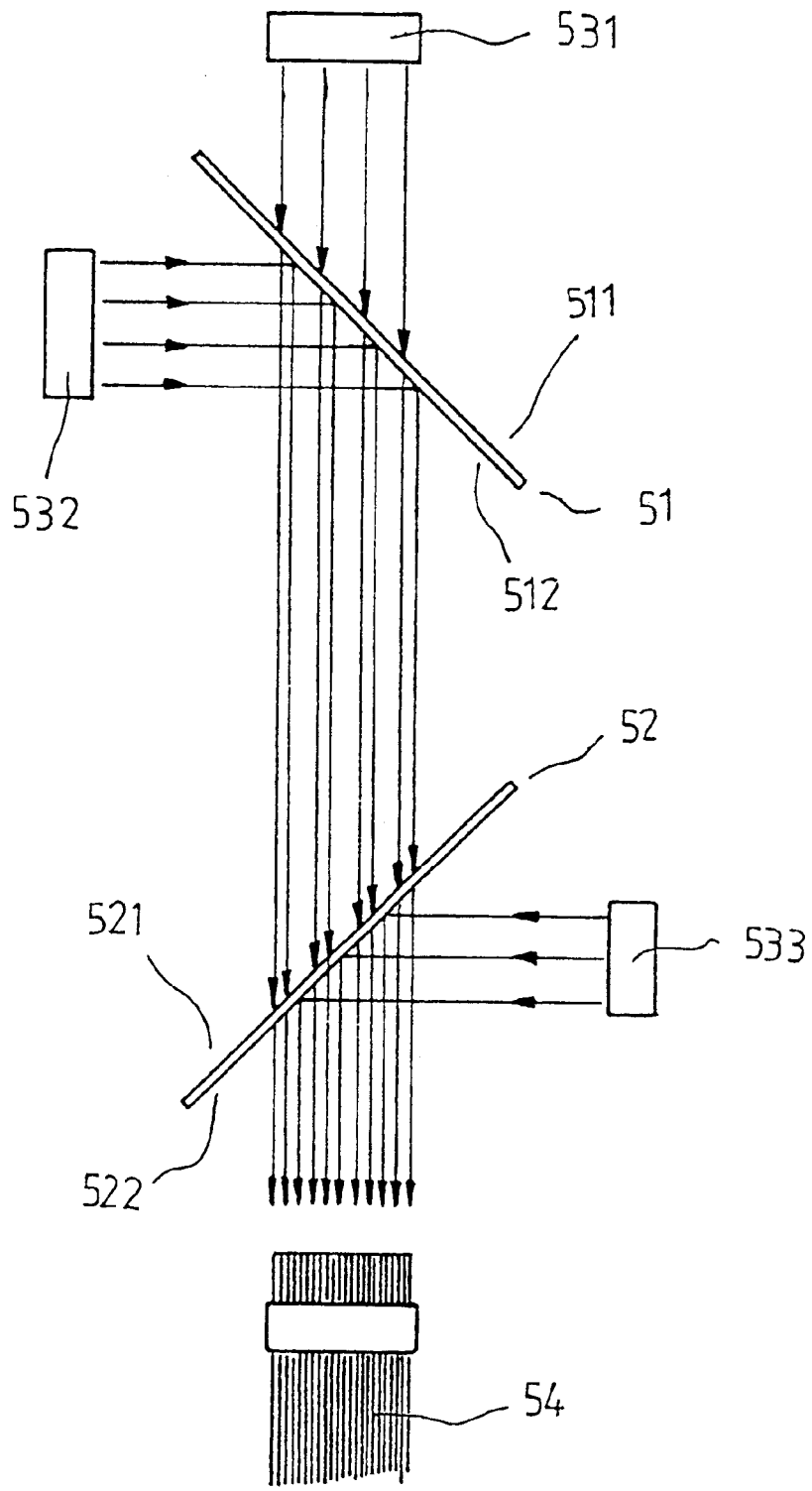
FIG. 6 is a plan view of a fourth embodiment of the present invention.

FIG. 6 shows a fourth embodiment of the present invention, in which two beam splitters 51, 52 are inclinedly disposed opposite to each other. Each beam splitter 51, 52 is disposed with a transmitting face 511, 521 and a reflecting face 512, 522 on two sides. The transmitting faces 511, 521 are arranged on the same side, whereby the light from the diode 531 can pass directly through the beam splitters 51, 52, while the light from the diode 532 is reflected by the reflecting face 512 of the beam splitter 51 and then passes through the beam splitter 52. The light from the diode 533 is directly reflected by the reflecting face 522 of the beam splitter 52. Therefore, the colors of the light from the diodes 531, 532. 533 can be properly mixed and conducted by the optical fibers 54 to create versatile change of colors.

Figure 7:
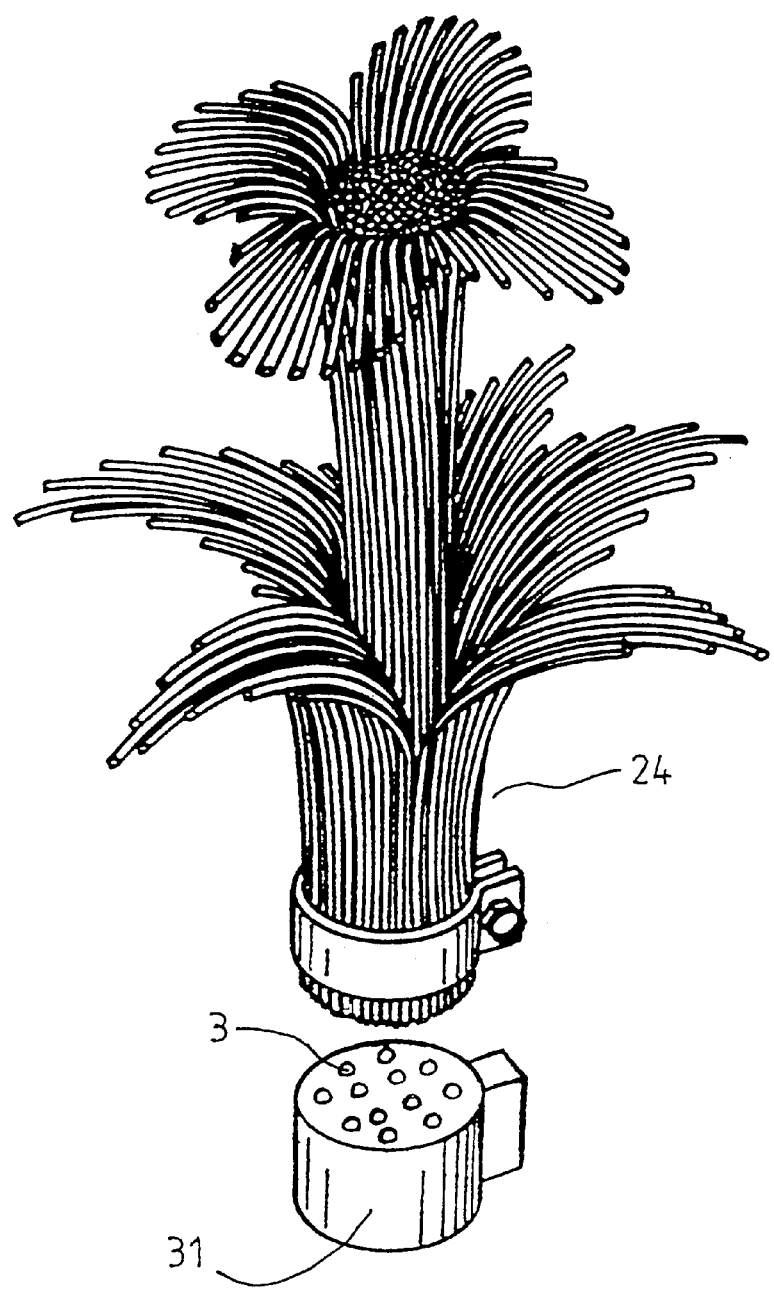
FIG. 7 is a perspective view of a fifth embodiment of the present invention.

FIG. 7 shows a fifth embodiment of the present invention, in which the lower ends of the optical fibers 24 are binded and positioned beside the control box 31 of a light emitting diode 3 with different color. The other ends of the optical fibers 24 are arranged into a solid pattern. The light emitting diode 3 in the control box 31 can create the flickering effect and change of colors as a decoration of bright points.

Figure 8:
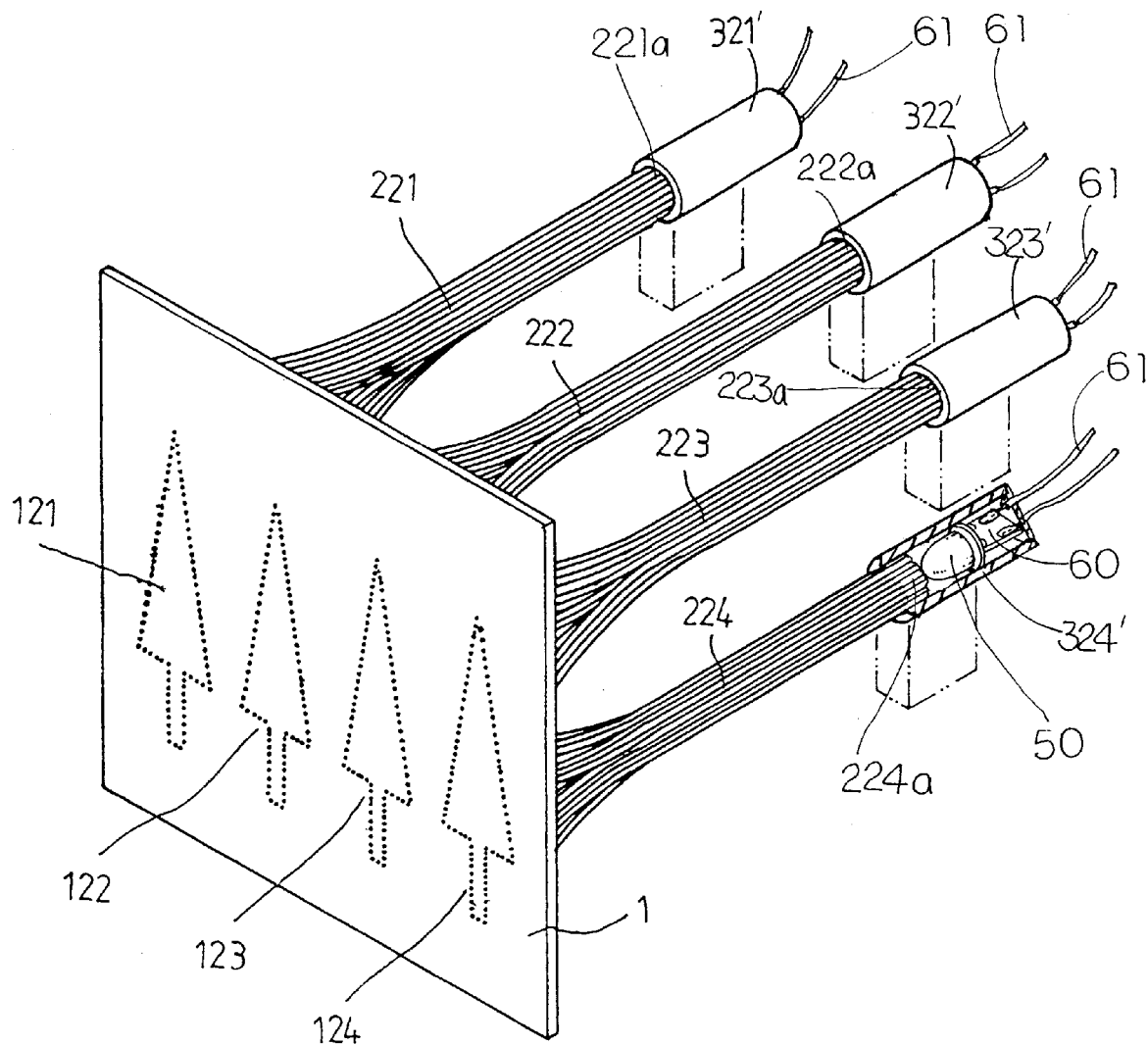
FIG. 8 is a partially exploded perspective view of a sixth embodiment of the present invention.

FIG. 8 shows a sixth embodiment of the present invention, which is an alternative mode of the above second embodiment and comprises a plurality of tubular binding frames 321', 322', 323', 324' made of non-transparent material. Root ends 221a, 222a, 223a, 224a of the optical fibers 221, 222, 223, 224 are firmly mounted into a front end of the tubular binding frames 321', 322', 323', 324'. The sets of light emitting diodes 50 and the electronic circuits 60 connected thereto are fittingly inserted into a rear end of the tubular binding frames 321', 322', 323', 324' respectively. Each set of light emitting diode 50 and the electronic circuit 60 is powered by electrical wires 61. Therefore, all the light emitted from each light emitting diode 50 will be totally directed and transmitted to the respective root ends 221a, 222a, 223a, 224a of the optical fibers 221, 222, 223, 224 without leaking of light. Moreover, if the light emitting diodes 50 inside the different binding frames 321', 322', 323', 324' have different colors, the binding frames 321', 322', 323', 324' can substantially prevent the different colored lights emitted from different light emitting diodes 50 from affecting with each other or causing unexpected color mixing effects.

FIG. 9 shows a seventh embodiment of the present invention, wherein a set of optical fibers 22" is illustrated. Each optical fiber 22" has a display end 22a" penetrated through a display member 1" to form a bright point. The light source structure of this seventh embodiment further comprises a tubular binding frame 32" for gathering and holding roots ends 22b" of the set of optical fibers 22" together in bundle form, a light collection sleeve 40" which is an extension tube made of non-transparent and flexible material such as plastic and has a front end 401" for fittingly connected with the binding frame 32" and a rear end 402" to fittedly receive and affixedly mount an electronic circuit 60" and at least a light emitting diode 50" which is powered by a power source 62" via electrical wires 61".

Accordingly, each light emitting diode 50" light source of particular color is integrally connected to the bundle of optical fibers 22" by means of the light collection sleeve 40", wherein the elongated and flexible light collection sleeve 40" not only can selectively bend to any desired angle, but also can substantially extend the distance between the optical fibers 22" and the light emitting diode 50" by directing and transmitting all the light energy onto the root ends 22b" of the optical fibers 22" through the light collection sleeve 40" without light leaking out. Moreover, the light emitting diodes 0" of different colors is protected from affecting with each other so that pure color can be directed to the desired optical fibers 22".

It should be noted that the above description and accompanying drawings are only used to illustrate some embodiments of the present invention, not intended to limit the scope thereof. Any modification of the embodiments should fall within the scope of the present invention.

What is claimed is:

1. A light source structure for optical fiber decoration, comprising:

a display member;

a set of optical fibers each having a root end and a display end penetrated through said display member to form a bright point;

at least one tubular binding frame for gathering and holding said roots ends of said set of optical fibers together in bundle form;

at least one light collection sleeve, which is an elongated tube made of non-transparent and flexible material, having a front end for fittingly connected with said binding frame and a rear end; and at least one light emitting diode received in said rear end of said respective light collection sleeve, so as to so as to totally direct and transmit the light emitted from said light emitting diode to said root ends of said optical fibers through said light collection sleeve without light leaking out, wherein said elongated and flexible light collection sleeve not only is capable of bending to a desired angle, but also substantially extends a distance between said set of optical fibers and said light emitting diode.

2. A light source structure for optical fiber decoration, as recited in claim 1, further comprises an electronic circuit which is disposed in said rear end of said light collection sleeve and connected to said light emitting diode that is powered by electrical wires.

* * * * *